(No Model.) 3 Sheets—Sheet 1.
W. TULLY.
APPARATUS FOR EXPANDING, BEADING, AND CUTTING TUBES, &c.
No. 548,100. Patented Oct. 15, 1895.
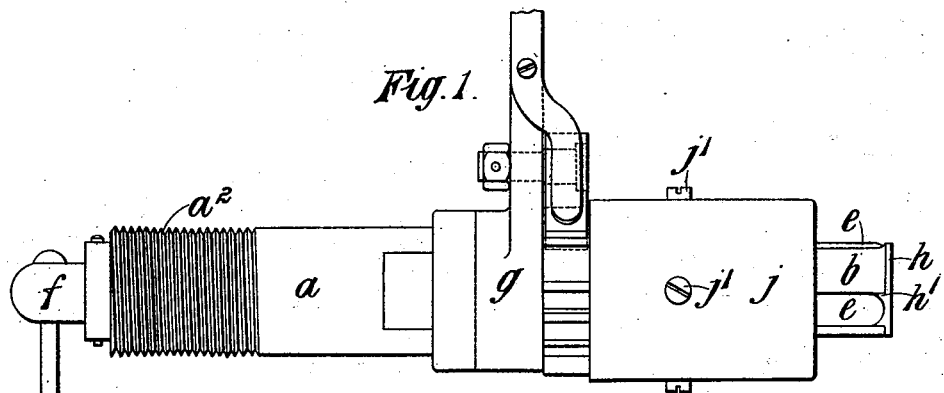
Fig. 1.
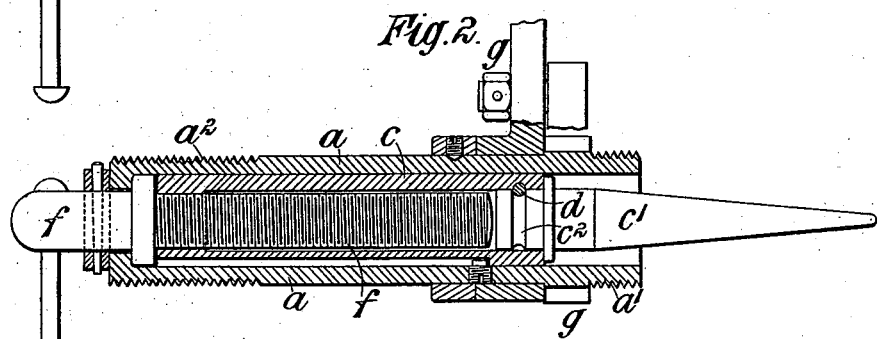
Fig. 2.
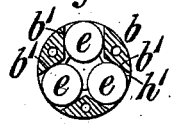
Fig. 4.
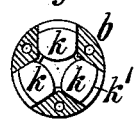
Fig. 5.
Fig. 3.
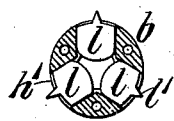
Fig. 7.
Fig. 9.
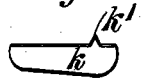
Fig. 6.
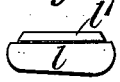
Fig. 8.
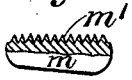
Fig. 10.
Witnesses.
G. W. Rea,
Robert Everett.
Inventor.
William Tully.
By James L. Norris
Atty.

(No Model.) 3 Sheets—Sheet 2.
W. TULLY.
APPARATUS FOR EXPANDING, BEADING, AND CUTTING TUBES, &c.
No. 548,100. Patented Oct. 15, 1895.
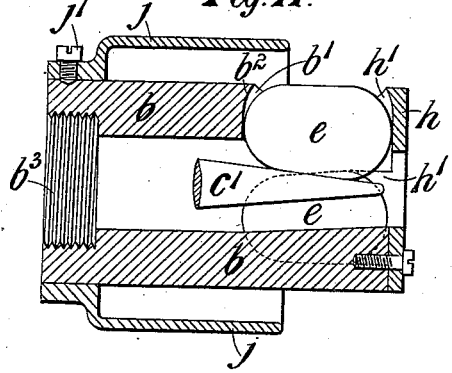
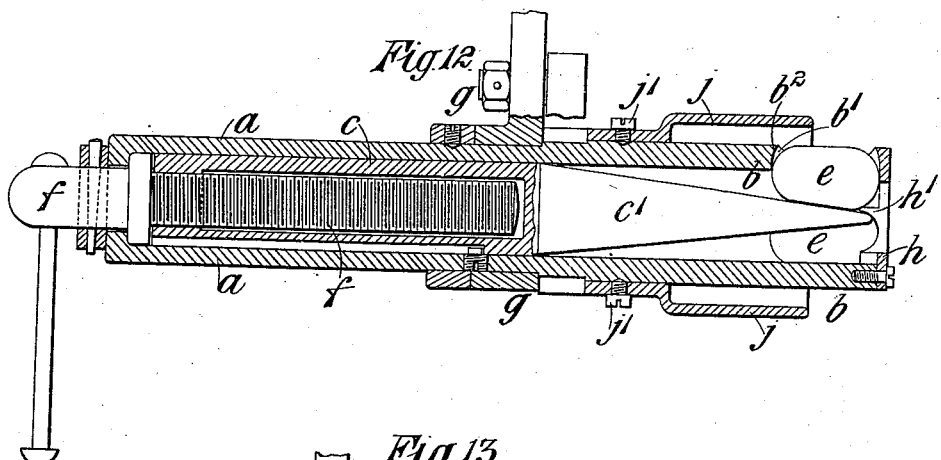
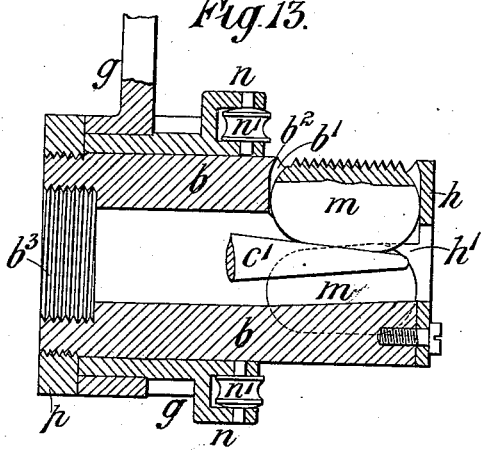
Witnesses.
Inventor:
William Tully.
By James L. Norris,
Atty.

(No Model.) 3 Sheets—Sheet 3.
W. TULLY.
APPARATUS FOR EXPANDING, BEADING, AND CUTTING TUBES, &c.
No. 548,100. Patented Oct. 15, 1895.
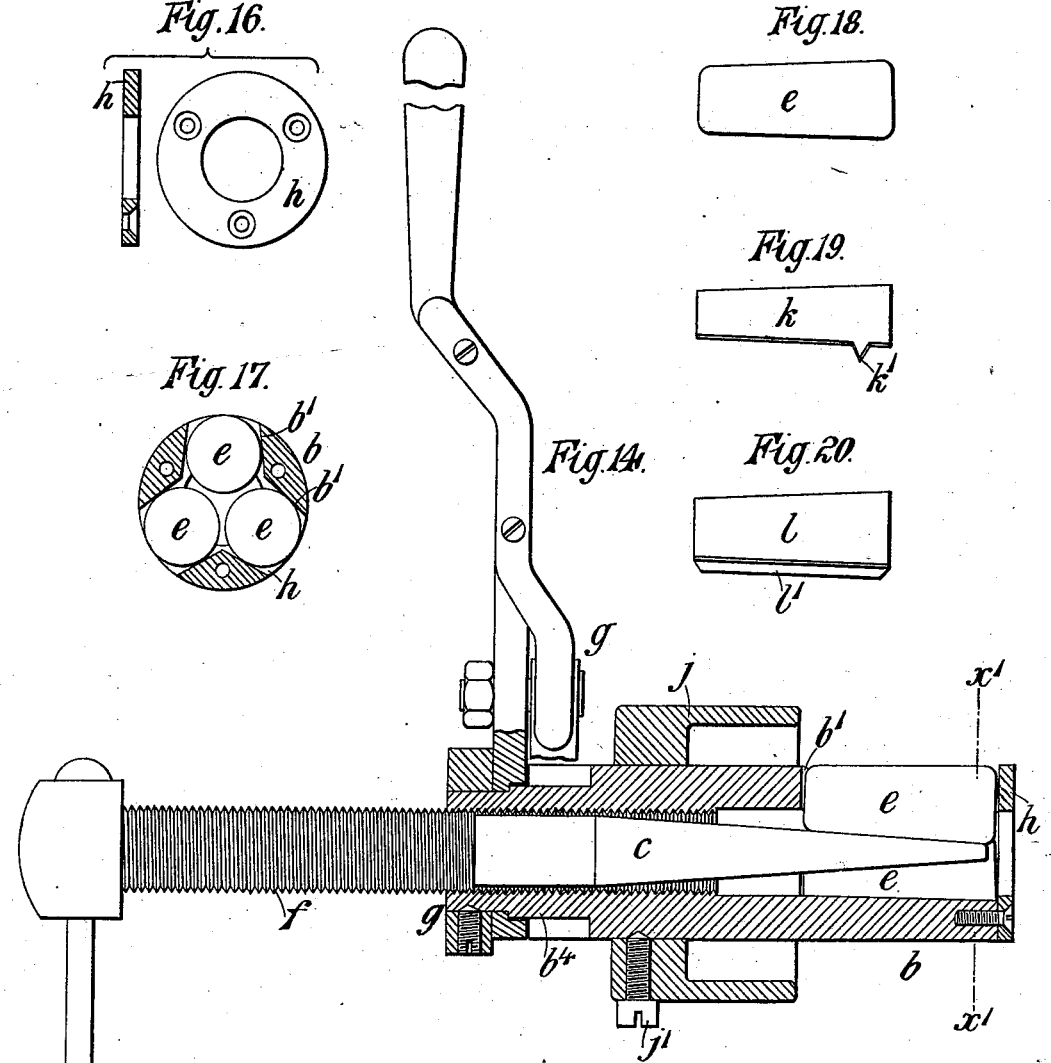

UNITED STATES PATENT OFFICE.

WILLIAM TULLY, OF LONDON, ENGLAND.

APPARATUS FOR EXPANDING, BEADING, AND CUTTING TUBES, &c.

SPECIFICATION forming part of Letters Patent No. 548,100, dated October 15, 1895.

Application filed October 9, 1894. Serial No. 525,423. (No model.) Patented in England July 19, 1894, No. 13,947.

*To all whom it may concern:*

Be it known that I, WILLIAM TULLY, engineer, a subject of the Queen of Great Britain, residing at London, England, have invented certain new and useful Improvements in Apparatus for Expanding, Beading, and Cutting Tubes and for Drilling and Broaching Holes in Tube-Plates and the Like and for Performing Similar Operations, (for which I have obtained a patent in Great Britain, No. 13,947, bearing date July 19, 1894,) of which the following is a specification.

My invention is chiefly designed to provide an improved combination tool or implement which will serve as a tube-expander for securely fastening the ends of tubes in the tube-plates of boilers, condensers, and the like, and which is capable of being readily adapted for performing other operations, viz: the cutting out of old tubes, the reboring or broaching of the holes in the tube-plates, and the holding of the implement in a tube during the beading of the end thereof.

In the accompanying drawings, Figure 1 is a side elevation of my improved implement or apparatus. Fig. 2 is a longitudinal central section showing the mandrel-case and its adjuncts, the roller-case being removed. Fig. 3 is a longitudinal central section of the roller-case. Fig. 4 is a transverse section on the line $x\ x$, Fig. 3. Fig. 5 is a similar view to Fig. 4, the tube-expanding rollers being replaced by the devices for cutting out old or damaged tubes. Fig. 6 is a side elevation of one of the said cutting devices. Fig. 7 is a similar view to Fig. 4, the rollers being replaced by the broaching-cutters. Fig. 8 is a side elevation of one of the said broaching-cutters. Fig. 9 is also a similar view to Fig. 4, the rollers being replaced by the devices for firmly retaining the implement in a tube during the beading of the end of such tube. Fig. 10 is a side elevation, partly in longitudinal section, of one of the said devices. Fig. 11 is a longitudinal central section showing a roller-case and rollers adapted for tubes of larger diameter. Fig. 12 is a longitudinal central section showing the means for beading the ends of the tubes. Fig. 13 is a sectional elevation illustrating a further modification of my improved apparatus. Fig. 14 shows a face view and a transverse section of the detachable cap. Fig. 15 is a transverse section on the line $x'\ x'$, Fig. 13. Figs. 16, 17, and 18 are side elevations showing, respectively, a roller, a tube-cutter, and a broaching-cutter for use with the apparatus shown in Fig. 13.

My invention consists partly in a roller-case constructed with a removable or detachable end piece or cap having projections for extending over the rounded ends of the rollers or alternative devices in the said case, which cap can be readily taken off to permit the removal of the rollers and the substitution of any of the alternative devices therefor. The apertures or cavities in the roller-case of my improved apparatus are in some instances made of the same width as the rollers, suitable overlapping pieces or projections being provided at the ends of such apertures or cavities to engage with the rounded ends of the said rollers or alternative devices, and thus retain the same in the roller-case, while leaving them free to move therein, as required. In other instances I dispense with the said overlapping projections at the ends of the apertures or cavities in the roller-case and arrange them at the sides of such apertures or cavities—that is to say, I make the said apertures or cavities taper from the interior to the exterior of the roller-case, so that while the rollers or alternative devices can move freely in the roller-case, as required, they cannot escape laterally therefrom. In this case I can make the rollers with flat, rounded, or other suitably-shaped ends.

My said invention also consists partly in the combination, with the apparatus above mentioned, of broaching and tube-cutting devices and devices for holding the implement in a tube while beading the said tube, which devices are made of such shape that they fit into the apertures or cavities for the rollers in the roller-case and will be retained therein, like the said rollers, by the aforesaid detachable cap.

My said invention further consists in other combinations and improvements hereinafter fully described and claimed.

Referring to Figs. 1 to 11, $a$ is the mandrel-case. $b$ is the roller-case. $c\ c'$ are the two parts of the mandrel, which are united by a swivel-joint consisting, for example, of a pin $d$, extending through a circumferential groove $c^2$ in the part $c'$ and firmly secured in the part $c$ in such a manner that it can be readily withdrawn and replaced, for the purpose hereinafter explained. $e\ e$ are the rollers. $f$ is the screw for adjusting the mandrel, as desired. $g$ is the ratchet for rotating the implement.

The rollers $e$ are made with rounded ends, as clearly shown in Figs. 3 and 11, and to insure the retention of the said rollers in the roller-case $b$, while permitting their rotation about their axes, the said case is made with apertures $b'$, of the same width as the rollers $e$, as shown in Fig. 4; but at the inner end of each of the said apertures an overlapping edge $b^2$ is provided to engage with the corresponding rounded end of the roller $e$. To the outer end of the case $b$ is secured, by screws or otherwise, a retaining piece or cap $h'$, formed with projections $h'$, which extend into the apertures $b'$ and engage with the ends of the rollers $e$, so that when the said rollers are inserted in the apertures $b'$ and the retaining-piece $h$ is secured to the roller-case $b$ the rollers, while free to turn about their axes and to move outward under the action of the mandrel, cannot escape from the roller-case. The said rollers can, however, when the cap $h$ is taken off, be readily removed and replaced by any of the aforesaid devices.

I make any desired number of roller-cases $b$ of different diameter and having larger or smaller rollers, and I adapt all of these roller-cases for use with one and the same mandrel-case $a$. For example, I make each roller-case with a female screw-thread $b^3$, which fits the male screw-thread $a'$ on the corresponding end of the mandrel-case $a$, so that the said roller-cases are interchangeable. I can thus provide at a much lower cost than heretofore the requisite apparatus for expanding, cutting, and beading tubes and broaching holes of any desired number of different sizes, as only one mandrel-case is required. In some instances I also make the mandrel with interchangeable taper or conical parts $c'$, the pin $d$ being withdrawn when the part $c'$ is to be changed.

$j$ is the usual ring or collar secured by screws $j'$ upon the roller-case $b$ in any required position, according to the extent to which the tubes project beyond the tube-plate, so as to determine the position of the rollers in the tube.

$k\ k$ are the cutters for cutting worn or damaged tubes to facilitate their removal from the tube-plates. $l\ l$ are the cutters for broaching the holes in the tube-plates. $m\ m$ are the improved devices for holding the implement firmly in place in a tube during the beading of the end of such tube. These cutters or devices are all made of the same width or thickness as the rollers $e$ and with correspondingly-shaped ends, so that they can be substituted for the rollers in the roller-case $b$, as indicated in Figs. 5, 7, and 9, and will be retained therein in the same manner as the said rollers, the cap $h$ being taken off to permit the removal of the rollers $e$ and the insertion of either set of the alternative devices, and being then again secured in place on the end of the roller-case $b$.

I make the above-mentioned alternative devices with flat sides, which bear against the corresponding flat sides of the apertures $b'$, and are thereby efficiently guided and supported.

The tube-cutters $k$ are made with sharp segmental cutting parts $k'$, and the broaching-cutters $l$ are made with longitudinal cutting-ribs $l'$.

The devices $m$ are made with a checkered or knurled surface $m'$, having a large number of points, which when the said devices are forced outward by the taper part $c'$ of the mandrel will be pressed against or into the metal of the tube in such a manner that there will be no liability to turning of the implement in the tube during the beading operation.

To provide for the use of the mandrel-case and ratchet as a ratchet-brace, I make the mandrel-case $a$ with an external screw-thread $a^2$, so that when the screw $f$ is taken out a suitable adjustable center may be screwed upon the end of said mandrel-case, and I provide a drill-socket having a female screw-thread to fit the male screw-thread $a'$ on the other end of the said mandrel-case. I thus increase the number of useful purposes for which the apparatus is applicable. If desired, I form on the roller-case $b$ an external screw-thread to receive the said drill-socket.

Instead of the ratchet shown in the drawings, I sometimes use one having a lever or handle formed with a box to cover or inclose the ratchet-wheel, a bolt-pawl being provided, which is held in engagement with the teeth of the said wheel by a spiral or other suitable spring.

When my improved apparatus is to be used for beading the tubes, the usual sleeve or collar $n$, provided with beading-rollers $n'$, is fitted upon the roller-case $b$, as shown in Fig. 12, and is arranged to be adjusted as the beading operation progresses by means of a nut $p$, screwed upon the roller-case $b$ and provided with tommy-holes or other means whereby it may be readily turned.

In the arrangement shown in Figs. 13 to 18 the cavities $b'$ of the roller-case $b$ are made slightly tapering from the interior to the exterior, as shown in Fig. 15, for the purpose of preventing the escape of the rollers or other devices laterally therefrom, the taper of the said cavities being such that when the rollers have been moved outward to the predetermined limit their further outward movement will be prevented by the converging sides of the said cavities, and the cap $h$ is made, as shown in Fig. 14, without any projections. The rollers *e* in this modification are made with flat ends, the cutters *k l* and the devices for holding the implement in the tube being made of corresponding shape.

In the arrangement shown in Fig. 13 the mandrel *c* and the screw *f* are formed in one piece, and the roller-case *b* is made with an internally-screw-threaded extension $b^4$ to receive the screw *f*.

I am aware of the United States patent to John Lohges, No. 270,446, dated January 9, 1883, and I make no claim to the apparatus described in the specification of the said patent.

What I claim is—

1. A combination tool for expanding boiler and other tubes, cutting out old tubes and broaching holes in tube-plates, which tool consists essentially of the interchangeable expanding, cutting and holding devices of the same general dimensions, the roller-case having radial apertures open at the extremity of said case to admit either set of said expanding, cutting and holding devices, and the removable cap on the extremity of said case to retain said devices in the apertures, said apertures being made with overlapping or converging sides to prevent the escape of said devices laterally from said case, as hereinbefore described.

2. In a combination tool for the purposes above specified, a roller-case or holder having lateral or radial apertures for the rollers open at one end of said case or holder, and a removable cap secured on the extremity of said case or holder to retain said rollers in the apertures, the walls of said apertures converging toward the exterior of said case or holder to prevent the escape of said rollers laterally therefrom, substantially as described.

3. In a combination tool for the purposes above specified, a roller-case or holder having a screw-thread at one end and adapted to be secured on a corresponding screw-thread on the end of a mandrel-case, and having lateral or radial apertures for the rollers open at the other end of said case or holder, and a removable cap secured on the extremity of said case or holder to retain said rollers in the apertures, the walls of said apertures converging toward the exterior of said case or holder to prevent the escape of said rollers laterally therefrom, substantially as described.

WILLIAM TULLY.

Witnesses:
 GEO. HAYE,
 ERST JONES.